April 24, 1951  C. L. CARLSON  2,550,039
FISHING PLUG CONTAINER OR HOUSING
Filed Feb. 9, 1948
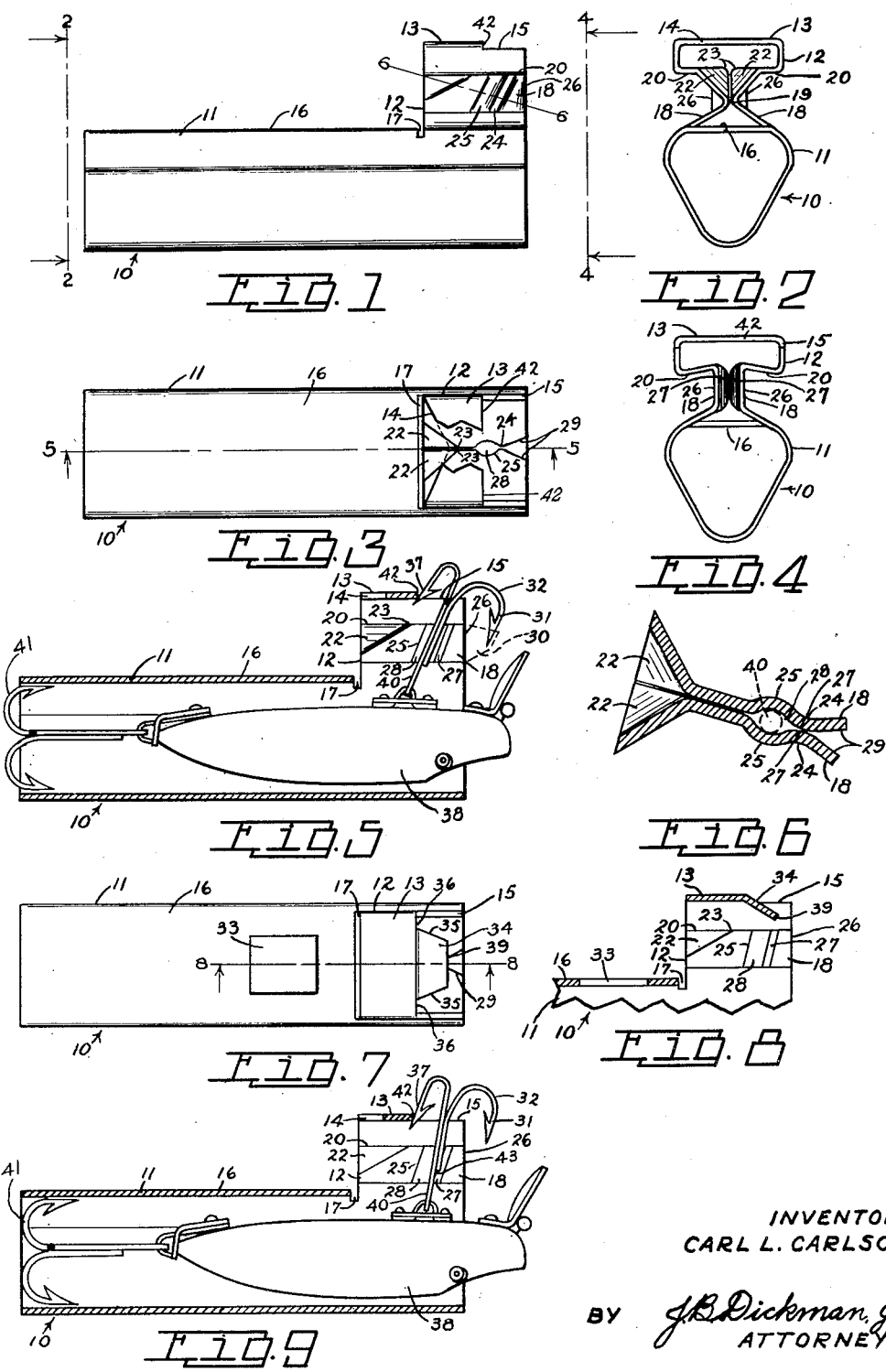
INVENTOR
CARL L. CARLSON
BY J.B.Dickman, Jr.
ATTORNEY Patented Apr. 24, 1951

2,550,039

UNITED STATES PATENT OFFICE 2,550,039

FISHING PLUG CONTAINER OR HOUSING

Carl L. Carlson, Moline, Ill.

Application February 9, 1948, Serial No. 7,067

10 Claims. (Cl. 43—57.5)

The present invention relates to a fishing plug container or housing.

All, who follow the piscatorial sport, have in their tackle box different types of plugs or lures. These plugs or lures are equipped with either a single hook or a plurality of gang hooks, the gang hooks usually being three in number as a unit and being in opposed relation to each other and arranged in a triangular formation. As a general rule, the hooks, unless a protector is placed on the individual barbs get tangled with other equipment in the tackle box, much to the disgust of the fisherman who has to spend a great deal of time untangling the plug or lure.

It is therefore an object of the present invention to provide a container or housing for fishing plugs or lures.

Another object of the present invention is the provision of a container or housing so constructed that fishing plugs or lures may be carried with safety in a tackle box or in the pockets of a fisherman.

A still further object of the present invention is the provision of a container or housing for fishing plugs or lures in which the barbs of hooks are protected to prevent entanglement with foreign objects.

A still further object of the present invention is the provision of a container or housing having means for securely holding a plug or lure therein.

A still further object of the present invention is the provision of means having a snap-action when a plug or lure is introduced into the container or housing, thus locking the plug or lure therein.

A still further object of the present invention is the provision of means adapted for abutment engagement with hooks of a plug or lure.

With these and other objects in view, the advantages of the present invention will become more fully apparent as reference is made to the accompanying drawing in which:

Figure 1 is a side elevational view of the device.

Figure 2 is an end elevational view on line 2—2 looking in the direction of the arrows.

Figure 3 is a top plan view with a portion broken away to disclose a plan view of the locking means for a shank of a hook.

Figure 4 is an end elevational view on line 4—4 of Figure 1 looking in the direction of the arrows.

Figure 5 is a sectional view taken on line 5—5 looking in the direction of the arrows with a plug or lure housed therein.

Figure 6 is an enlarged sectional view taken on line 6—6 of Figure 1 to show the configuration of the side walls above the body of the device.

Figure 7 is a top plan view of a modified form of the invention.

Figure 8 is a partial sectional fragmentary view taken on line 8—8 of Figure 7 looking in the direction of the arrows.

Figure 9 is a sectional view similar to Figure 5 and illustrating the position of a plug or lure at its release point, and showing the fulcrum point of engagement of the hook shank.

Referring to the drawings the numeral 10 represents a housing, the section 11 of the housing having a raised section 12 at one end that extends above the section 11, the section 12 in its top surface 13 having a V-shaped cut out portion 14 and a portion 15 cut away. The top 16 of the section 11 is provided with a transverse cut out portion 17 thus providing resiliency to side walls 18. The housing may be made of any suitable material such as plastic, metal and the like. Plugs or lures have gang hooks, and the plugs or lures are made in various shapes and sizes, and I therefore wish to have it distinctly understood that I do not wish to confine the housing of the device to the shape and size illustrated in the drawing, as the invention may be incorporated in various shapes to conform to the various shapes of plugs or lures.

The raised section 12 as shown in Figure 2 has its side walls 18 emanating from the section 11 and these walls are disposed inwardly to a meeting point 19, and from this point the walls flare outwardly and upwardly to the base 20 of the raised section 12. By this formation of the side walls 18 it is to be noted that flat surfaces are formed and they are angularly disposed to each other and in the form of triangles 22, the apices being at a point indicated by the numeral 23, thus assisting in giving resiliency to the side walls 18.

As shown in Figures 3 and 4, and in the enlarged view Figure 6, the remaining portions of the side walls 18 at 24 are concave, and at 25 convex, portions 26 of the side walls 18 being approximately vertical. In the enlarged sectional view Figure 6, the side walls 18 are spaced apart, the concave portion 24 forming what I term abutments 27, the convex portions 25 forming a groove 28, the abutments 27 and concave portions 24 being inclined and disposed at an angle, the ends 29 being flared outwardly simulating the configuration of a V. If desired an extension 30, as shown by dotted lines in Figure 5 may be provided to protect hook 31 of gang hook 32.

If desired, as shown in Figures 7 and 8 an opening 33 may be provided in the top wall 16 of the section 11 providing a window to look through to select a desired plug or lure, which, as a general rule has indicia thereon indicating the kind or type of plug or lure. The top wall 13 of the raised section 12 may be provided with a downwardly disposed lip 34, the side walls 35 being disposed at an angle and offset inwardly from the side walls 18 providing an impingement point 36 for the barbs 37 of the gang hook 32 on the plug or lure 38, the edge 39 of the lip 34 adapted to engage the shank 40 of the gang hook 32 to act or serve as a pressure means for the shank to impinge against when the plug or lure is housed in the housing or when the plug or lure is being removed from the housing.

In using the present device a plug or lure 38 having gang hooks 32 and 41 are inserted in the housing 10 in the direction of the arrow Figure 5. During inward movement of the plug or lure into the housing, the side walls 18 and vertical portions 26 spread apart due to the shank 40 engaging the abutments 27. As the plug or lure 38 continues to move inwardly, the shank 40 being in engagement with the abutments, and due to the angular construction of the walls of the abutments, the abutments spread, allowing the shank 40 to pass into the groove 28, the walls 18 and abutments 27 snapping back into their original position. The shank 40 when housed in the groove 28 assumes an angular position conforming to the angle of the groove, thus securing the plug or lure in the housing. It is well known in the art that a gang hook usually comprises 3 hooks, and as shown in Figure 5 two of the hooks abut against the end edge 42 of the top 13 (only one hook being shown), and this impingement exerts a pressure force to the shank 40, the inner walls of the convex portion impinging the shank 40, the shank being represented by the dotted circle in Figure 6.

In Figure 9, the plug or lure 38 is shown in the position it assumes when pressure of fingers of either the right or left hand of a person are applied to the hooks 41, the plug moving a slight distance towards the right just before it snaps out of the housing. The shank 40 during this movement of the plug to the right, assumes an almost vertical position, the barbs 37 of the hooks 32 being pressed against the edge 42 of the top 13, a portion of the shank 40 engaging the abutments at approximately the point 43, the point 43 serving as a fulcrum point, and as the shank passes the fulcrum point, the pressure is released, the plug or lure released from the housing, the walls 18 and abutments 27 assuming a closed position.

In the modified form of the invention shown in Figures 7 and 8 the removal action of the plug is the same as described, except that an additional pressure point 39 is provided against which the shank 40 impinges when the plug is being removed from the housing.

While the present invention has been disclosed in connection with certain specific embodiments thereof, it is to be understood that these are by way of example rather than by way of limitation, and that the invention is to be defined by the attendant claims which should be given a scope as broad as is consistent with the prior art.

What is claimed is:

1. In a device of the class described, a housing for the reception of a fishing plug having hooks, a transverse groove in the top surface of said housing means for releasably retaining said plug in said housing, said plug being accessible for movement relative to said housing, and means effective upon a predetermined movement of said plug relative to said housing and acting in concert with said retaining means for placing said hooks under tension which upon further movement of said plug will result in a snap action rejection of said plug from said housing.

2. A housing for a fishing plug having hooks comprising, a section, means offset on one end of said section for protecting the barbs of the hooks on said plug, and means in said first named means for releasably locking said plug in said housing.

3. In a device of the class described, an open ended housing into which a plug is endwise insertable, and means formed integrally with said housing for releasably retaining said plug in said housing, said means extending laterally from the housing, said means constituting a portion of the housing extending laterally exteriorly from another portion of the housing.

4. In a device of the class described, a housing for receiving and protecting a fishing plug having hooks, and means on said housing and engageable by said hooks for holding said plug in said housing against accidental dislodgement said means constituting a portion of the housing extending laterally exteriorly from another portion of the housing.

5. A housing for a fishing plug having hooks, said housing comprising a tubular section having a top surface, and means on one end of said section extending upwardly and in spaced relation from the top surface of said tubular section for resiliently securing said hooks in said means when said plug is housed in said tubular section.

6. A housing for a fishing plug having hooks, said housing comprising a tubular section having a top surface, means on one end of said section extending upwardly therefrom and in spaced relation from the top surface of the tubular section for resiliently securing said hooks in said means when said plug is housed in said tubular section, and means on said first named means acting as a pressure receiving means for said hooks.

7. A housing for a fishing plug having hooks, said housing comprising a tubular section having a top surface, means on one end of said section extending upwardly therefrom and in spaced relation from the top surface of the tubular body for resiliently securing said hooks in said means when said plug is housed in said tubular section, means on said first named means acting as a pressure receiving means for said hooks, and releasable means in said first mentioned means for locking the shank of said hooks in said first named means and locking the plug in said housing.

8. A housing for a fishing plug having hooks, said housing comprising a tubular section having a top surface, means on one end of said section extending upwardly therefrom and in spaced relation from the top surface of the tubular section for resiliently securing said hooks in said means when said plug is housed in said tubular section, means on said first named means acting as a pressure receiving means for said hooks, releasable means in said first mentioned means for locking the shank of said hooks in said first named means and locking the plug in said housing, and said last mentioned means being effected by a predetermined endwise movement of said plug in said housing for ejecting the plug from said housing.

9. A housing for a fishing plug having hooks, said housing comprising a tubular section having a top surface, and means on one end of said section extending upwardly therefrom, the upper surface of said section having a transverse slot formed therein adjacent said means extending upwardly.

10. A housing for a fishing plug of the type having hooks thereon wherein said housing comprises a section for enclosing the plug and portions of the hooks, said section being provided with laterally extending means, the latter having releasable means for locking said plug in said housing.

CARL L. CARLSON.

REFERENCES CITED

The following references are of record in the file of this patent:

UNITED STATES PATENTS

| Number | Name | Date |
|---|---|---|
| 1,788,674 | Hughes | Jan. 13, 1931 |
| 2,153,489 | Whitis | Apr. 4, 1939 |
| 2,292,709 | McCann | Aug. 11, 1942 |

FOREIGN PATENTS

| Number | Country | Date |
|---|---|---|
| 6,691 | Great Britain | Apr. 18, 1891 |